(12) United States Patent
Tan et al.

(10) Patent No.: US 10,709,982 B2
(45) Date of Patent: Jul. 14, 2020

(54) INFORMATION PROCESSING METHOD, APPARATUS AND NON-TRANSITORY STORAGE MEDIUM

(71) Applicant: NETEASE (HANGZHOU) NETWORK CO., LTD., Hangzhou (CN)

(72) Inventors: Zhikang Tan, Hangzhou (CN); Jingya Zhang, Hangzhou (CN)

(73) Assignee: NETEASE (HANGZHOU) NETWORK CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 16/130,980

(22) Filed: Sep. 13, 2018

(65) Prior Publication Data

US 2019/0083887 A1    Mar. 21, 2019

(30) Foreign Application Priority Data

Sep. 15, 2017 (CN) .......................... 2017 1 0839320

(51) Int. Cl.
*A63F 13/56* (2014.01)
*A63F 13/2145* (2014.01)
(Continued)

(52) U.S. Cl.
CPC .......... *A63F 13/56* (2014.09); *A63F 13/2145* (2014.09); *A63F 13/42* (2014.09);
(Continued)

(58) Field of Classification Search
None
See application file for complete search history.

(56) References Cited

U.S. PATENT DOCUMENTS

2001/0046896 A1\* 11/2001 Miyamoto ............. A63F 13/06
463/31
2011/0039618 A1\* 2/2011 Ichiyanagi ........... A63F 13/803
463/31

(Continued)

FOREIGN PATENT DOCUMENTS

| CN | 105413171 A | 3/2016 |
| CN | 105597310 A | 5/2016 |
| CN | 107019909 A | 8/2017 |

OTHER PUBLICATIONS

Novice guide of mobile game "Ghost Story", which helps you play more easily.

*Primary Examiner* — Damon J Pierce
(74) *Attorney, Agent, or Firm* — Yunling Ren

(57) ABSTRACT

The present disclosure provides an information processing method, an apparatus using the method and a non-transitory storage medium thereof. The method includes: when a first touch operation on the first touch operation area is detected, adjusting a presentation field of the game scene in the graphical user interface according to the first touch operation; when a preset action of the first touch operation is detected, determining a path point in the game scene according to a touch point of the preset action, and controlling the virtual character to move automatically towards the path point in the game scene according to a preset path finding strategy; and when a preset cancellation operation is detected, cancelling the path point and configuring the virtual character to move in the game scene according to the second touch operation on the second touch operation area.

19 Claims, 10 Drawing Sheets

(51) Int. Cl.
    *A63F 13/42*           (2014.01)
    *A63F 13/537*         (2014.01)
    *A63F 13/426*         (2014.01)
    *A63F 13/5372*       (2014.01)
    *A63F 13/5255*       (2014.01)

(52) U.S. Cl.
    CPC .......... *A63F 13/426* (2014.09); *A63F 13/537* (2014.09); *A63F 13/5372* (2014.09); *A63F 13/5255* (2014.09)

(56) References Cited

U.S. PATENT DOCUMENTS

| | | | |
|---|---|---|---|
| 2014/0066195 A1* | 3/2014 | Matsui | A63F 13/42 463/30 |
| 2018/0364802 A1* | 12/2018 | Cederlund | G06F 3/038 |
| 2018/0373376 A1* | 12/2018 | Kurabayashi | G06F 3/0488 |

\* cited by examiner

US 10,709,982 B2

INFORMATION PROCESSING METHOD, APPARATUS AND NON-TRANSITORY STORAGE MEDIUM

CROSS-REFERENCE TO RELATED APPLICATIONS

This application is based on and claims priority to Chinese patent application No. 201710839320.X filed on Sep. 15, 2017. The entire content of which is hereby incorporated by reference for all purposes.

TECHNICAL FIELD

The present disclosure relates to the field of game technology, and in particular, to an information processing method, an apparatus using the method and a non-transitory storage medium thereof.

BACKGROUND

With development of mobile intelligent terminals and game industry, a large number of mobile games with different themes have emerged, to meet needs of users. A plurality of users teaming up for game battles is a core gameplay of many mobile games. For example, the core gameplay of mobile games of a MOBA (Multiplayer Online Battle Arena) type is to form a team of 5V5 for battling. During the period when users team up for battle, it is vital for users to realize interaction with virtual characters in parallel at the same time (for example, a user must simultaneously take into consideration his own character's actions and view battle situations of teammates outside his/her visual field (field hereinafter)). Therefore, whether it is possible to provide a convenient and quick interaction mechanism to enable the user to implement multi-thread operation is an important influencing factor of user experience for such mobile games.

SUMMARY

Embodiments of the present disclosure provides an information processing method, an information processing apparatus using the method, and a non-transitory storage medium thereof, to at least solve a part of the above mentioned technical problem of the prior art.

According to the first aspect the present disclosure, an information processing method is provided, wherein a software application is executed by a processor of a mobile terminal and a graphical user interface is rendered on a touch display of the mobile terminal, the graphical user interface includes a first touch operation area and a second touch operation area, content presented by the graphical user interface at least comprises a part of a game scene and a virtual character, and the method includes:

when a first touch operation on the first touch operation area is detected, adjusting a presentation field of the game scene in the graphical user interface according to the first touch operation;

when a preset action of the first touch operation is detected, determining a path point in the game scene according to a touch point of the preset action, and controlling the virtual character to move automatically towards the path point in the game scene according to a preset path finding strategy; and when a preset cancellation operation is detected, cancelling the path point, and configuring the virtual character to move in the game scene according to the second touch operation on the second touch operation area.

According to the second aspect of the present disclosure, an information processing apparatus is provided, which includes:

a processor; and a memory for storing instructions executable by the processor, wherein the processor is configured to perform the information processing method according to the first aspect of the present disclosure by preforming the instructions.

According to the third aspect of the present disclosure, a non-transitory storage medium is provided, which has stored therein instructions that, when executed by a processor, causes the information processing apparatus to perform the information processing method according to the first aspect of the present disclosure.

Through the method provided by the present disclosure, operation space of the user is increased. When the virtual character moves, game scene pictures outside the field can be viewed at the same time. Behavior presetting is performed by using idle time and predictive ability of the user, which reduces stress of gusty parallel operation behaviors, and thus reducing the operating doorsill. In addition, the control of the virtual character whose behavior operation has been preset by the user may be restored at any time, so switching to/from the existing interaction manner may be achieved easily. Thereby, the present disclosure solves the technical problem that the multi-thread operation cannot be realized in the interaction manner of a mobile terminal.

BRIEF DESCRIPTION OF THE DRAWINGS

The drawings described herein are provided for further illustration of the present disclosure, and constitute a part of the present application. The exemplary embodiments of the present disclosure and descriptions thereof are used to explain the present disclosure, and do not constitute improper limits to the present disclosure. In the drawing.

DETAILED DESCRIPTION

Figure 1:
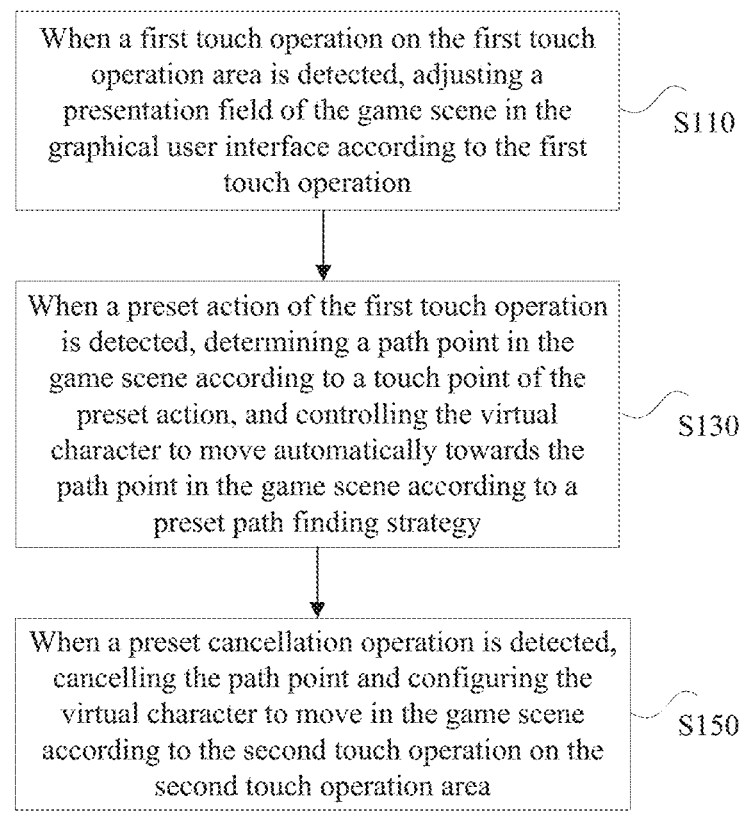
FIG. 1 is a flowchart of an information processing method according to one embodiment of the present disclosure.

In a related art, the interaction between the virtual character and the user is a real-time response, and mainly includes:

1) after a user clicks a certain location on a map, the character operated by the user is triggered to move towards the corresponding location in the game scene. The character will be wait for a next instruction after arrived such location; 2) by using a left joystick and responding to a current operation of the user in real time, the virtual character is controlled.

In the existing interaction manner, a user will consume a lot of energy under the condition of multi-thread operation. Especially when the multi-thread operation requires a fast time response of the user, the user cannot realize interaction with the virtual characters in parallel at the same time. A MOBA game (such as the King Glory) with a virtual joystick is taken as an example here. It is difficult to both give consideration to the actions of the user's own character and view battle situations of his/her teammates, so that the user has to give up one of them. This kind of interaction manner not only harms interests of users, but also increases the operating barriers and reduces game experience.

With regard to the above problems, no effective solution has been proposed yet.

In order to make those skilled in the art better comprehend the technical solutions of the present disclosure, the technical solutions in the embodiments of the present disclosure will be described clearly and completely in the following with reference to the accompanying drawings in the embodiments of the present disclosure. The described embodiments are only a part of embodiments of the present disclosure and not all of the embodiments. All other embodiments obtained by persons of ordinary skill in the art based on the embodiments of the present disclosure without creative efforts shall fall within the protection scope of the present disclosure.

It should be noted that, terms "first". "second" and the like in the description, claims and the foregoing drawings of the present disclosure are used to distinguish similar objects only and not necessarily describe a specific sequence or precedence order. It should be understood that such used data may be interchanged where appropriate, so that the embodiments of the disclosure described herein can be implemented in orders other than those illustrated or described herein. In addition, the terms "include" and "have" and any variation thereof are intended to cover non-exclusive inclusions. For example, a process, a method, a system, a product, or an apparatus that includes a series of steps or units is not necessary to be limited to those steps or units listed clearly, but may include other steps or units not explicitly listed or inherent to these processes, methods, products or devices.

According to one embodiment of the present disclosure, an information processing method is provided. It should be noted that the steps shown in the flowchart of the drawings may be performed in a computer system containing such as a set of computer-executable instructions. Besides, although a logical order is shown in the flowchart, the illustrated or described steps may be performed in a different order in some cases.

FIG. 1 is a flowchart of an information processing method according to an embodiment of the present disclosure. As shown in FIG. 1, an information processing method is provided, wherein a software application is executed by a processor of a mobile terminal and a graphical user interface is rendered on a touch display of the mobile terminal, the graphical user interface includes a first touch operation area and a second touch operation area, content presented by the graphical user interface at least includes a part of a game scene and a virtual character, and the method may include following steps:

step S110, when a first touch operation on the first touch operation area is detected, adjusting a presentation field of the game scene in the graphical user interface according to the first touch operation:

step S130, when a preset action of the first touch operation is detected, determining a path point in the game scene according to a touch point of the preset action, and controlling the virtual character to move automatically towards the path point in the game scene according to a preset path finding strategy; and step S150, when a preset cancellation operation is detected, cancelling the path point and configuring the virtual character to move in the game scene according to the second touch operation on the second touch operation area.

A multi-thread operation refers to a game behavior controlling two or more scenes or interaction interfaces in a game at the same time. For example, movement of a character is controlled in a game scene field, and at the same time, a game condition of teammates is observed in another game scene field. For another example, movement of a character is controlled in a game scene, and at the same time, property is purchased in a game property shop interface. Since a screen display area itself of a mobile touch terminal (such as a mobile phone) is already very limited and the display screen is also used as a touch panel for the user to manipulate the game, interaction interfaces or scenes of different operation threads often cannot be presented at the same time due to blocking or replacing each other in case of multi-threading. In case of multi-threading, operation of switching scenes or interaction interfaces becomes extremely complicated, so the parallel operation is extremely difficult to be conducted and the user experience is poor. Therefore, existing mobile games are difficult to implement multi-thread operation. Through the information processing method in the present exemplary embodiment, on the one hand, the operation space of the user is increased, the multi-thread operation is achieved, and when the virtual character moves, game scene pictures outside the field can be viewed at the same time. On the other hand, behavior presetting may be performed by using idle time and predictive ability of the user, which reduces the stress of gusty parallel operation behaviors, and thus reducing the operating doorsill. In addition, the control of the virtual character whose behavior operation has been preset by the user may be restored at any time, so switching to/from the existing interaction manner may be achieved easily. Thereby, the present disclosure solves the technical problem that the multi-thread operation cannot be realized in the interaction manner of a mobile terminal.

The steps of the information processing method in this exemplary embodiment will be further described with reference to FIGS. 2 to 4 and 8 to 10.

In the present exemplary embodiment, a software application is executed by a processor of a mobile terminal 200 and a graphical user interface 210 is rendered on a touch display of the mobile terminal 200. The graphical user interface 210 includes a first touch operation area 220 and a second touch operation area 230. Content presented by the graphical user interface 210 at least includes a part of a game scene 240 and a virtual character 250.

In step S110, when a first touch operation on the first touch operation area is detected, a presentation field of the game scene in the graphical user interface is adjusted according to the first touch operation.

In this exemplary embodiment, when a first touch operation on the first touch operation area 220 is detected, a presentation field of the game scene 240 in the graphical user interface 210 is adjusted according to the first touch operation.

Figure 2:
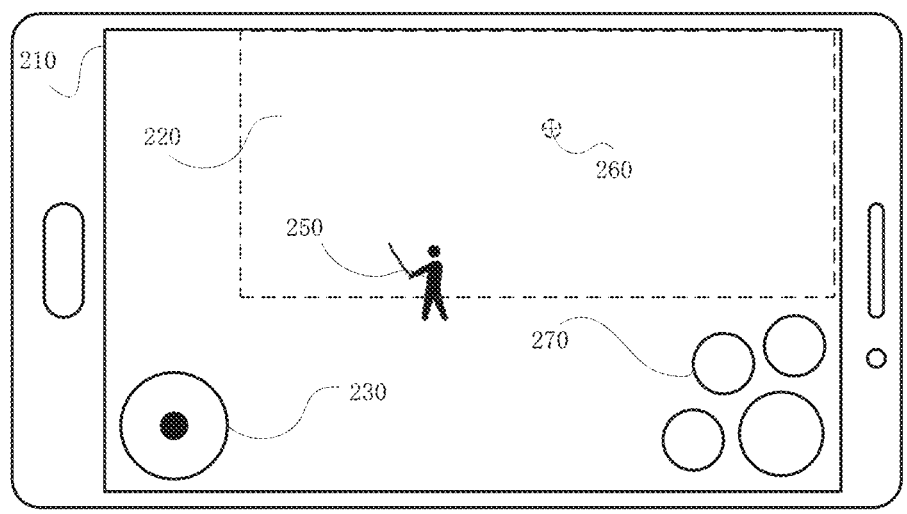
FIG. 2 is a schematic diagram of a graphical user interface of a mobile terminal according to one embodiment of the present disclosure.

The first touch operation area 220 may be an area having a visual indication effect in the graphical user interface 210, or may be an area without a visual indication effect. The present exemplary embodiment does not limit the shape, size, and visual presenting effect of the first touch operation area 220. For example, in a specific embodiment of the present disclosure, as shown in FIG. 2, the first touch operation area 220 is a rectangular area at an upper portion of the graphical user interface 210. To avoid blocking the game scene 240, the first touch operation area 220 is an area without a visual indication effect. In other embodiments, the first touch operation area 220 may be an area that is geometrically similar to and of equal size to the outer contour of the graphical user interface 210, and may also be an area of any shape and size, or may be an area having a visual indication effect with a preset transparency.

Figure 3:
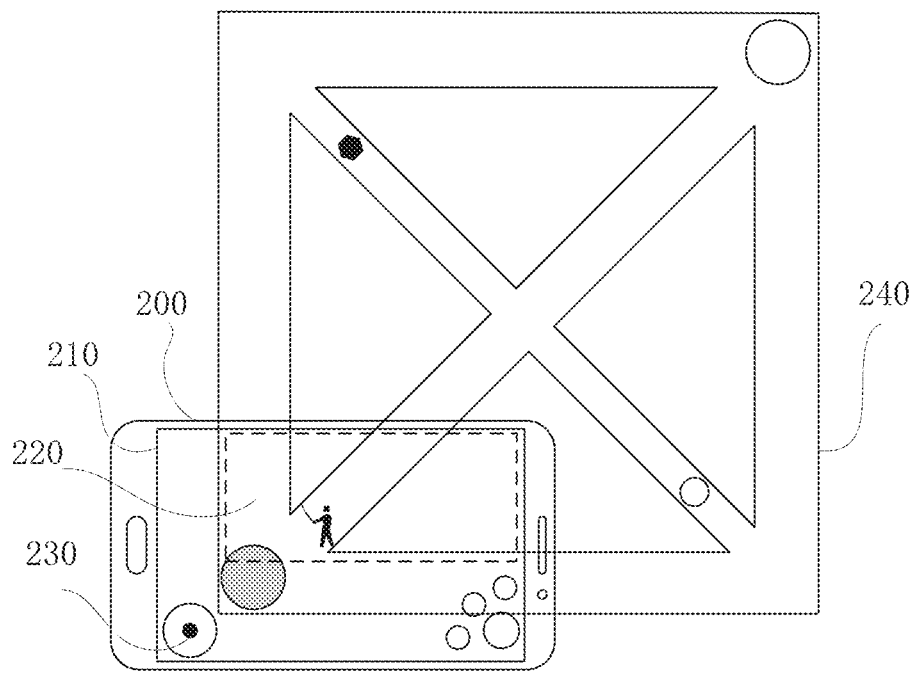
FIG. 3 is a schematic diagram of a first game scene according to one embodiment of the present disclosure.

The content presented by the graphical user interface 210 may include all the game scene 240, and may also be a part of the game scene 240. For example, in a specific embodiment of the present disclosure, as shown in FIG. 3, since the game scene 240 is relatively large, only a local content of the game scene 240 is displayed on the graphical user interface 210 of the mobile terminal 200 during the game.

Figure 4:
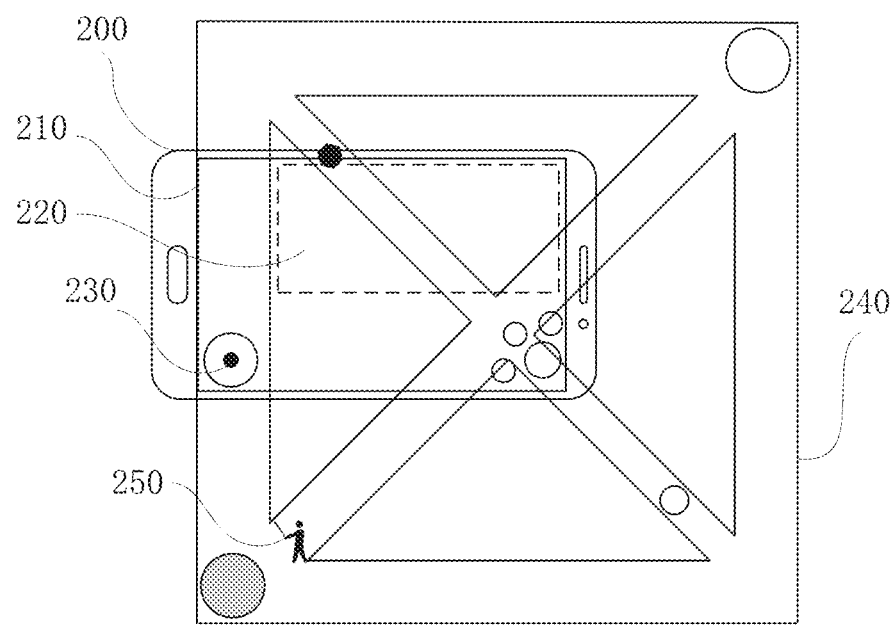
FIG. 4 is a schematic diagram of a second game scene according to one embodiment of the present disclosure.

In the present exemplary embodiment, the first touch operation includes: a slide operation on the first touch operation area 220. Specifically, when the slide operation on the first touch operation area 220 is detected, the presentation field of the game scene 240 in the graphical user interface 210 is adjusted according to the first touch operation. For example, FIG. 3 is an initial presentation field of the game scene 240 in the graphical user interface 210. At this time, the virtual character 250 in the game scene 240 is displayed in a middle position of the graphical user interface 210. When a slide operation on the first touch operation area 220 is detected (for example, a upward slide operation on the first touch operation area 220 is detected), the presentation field of the game scene 240 in the graphical user interface 210 is adjusted according to the slide operation, as shown in FIG. 4. At this time, the virtual character 250 in the game scene 240 is not displayed in the graphical user interface 210.

Step S130: when a preset action of the first touch operation is detected, a path point in the game scene is determined according to a touch point of the preset action, and the virtual character is controlled to move automatically towards the path point in the game scene according to a preset path finding strategy.

In this exemplary embodiment, when the first touch operation in the above step S110 is detected, it may further be detected whether a preset action of the first touch operation is received. When the preset action of the first touch operation is detected, a path point is determined in the game scene 240 according to a touch point of the preset action, and the virtual character 250 is controlled to move automatically towards the path point in the game scene 240 according to a preset path finding strategy.

Figure 8:
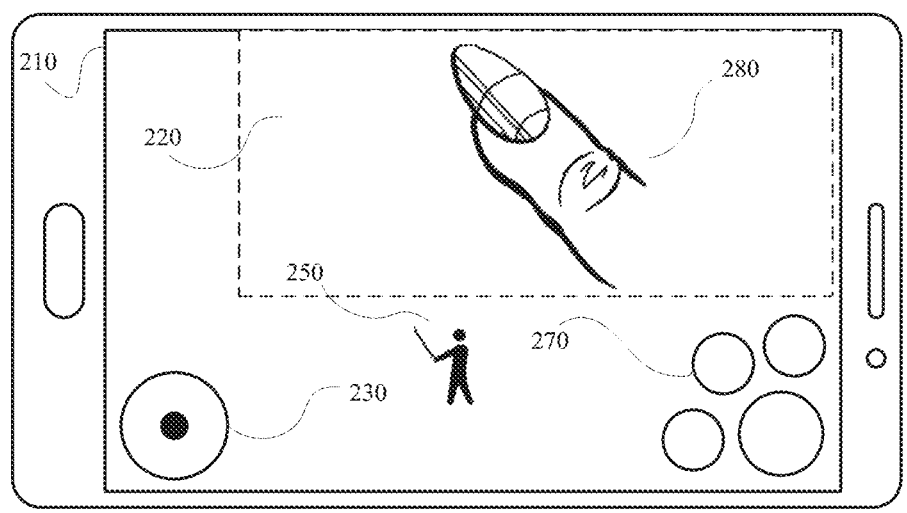
FIG. 8 is a schematic diagram of a game scene showing a press action exceeding a preset pressure according to one embodiment of the present disclosure.

Specifically, the preset action of the first touch operation may be a press action exceeding a preset pressure. For example, as shown in FIG. 8, during the period when the first touch operation adjusts the presentation field of the game scene 240 in the graphical user interface 210, when a press action from a finger 280 exceeds a preset pressure is detected, i.e., the user uses a finger to press heavily in the first touch operation area 220, a path point is determined in the game scene 240 according to a touch point of the press action, and the virtual character 250 is controlled to move automatically towards the path point in the game scene 240 according to a preset path finding strategy.

Figure 9:
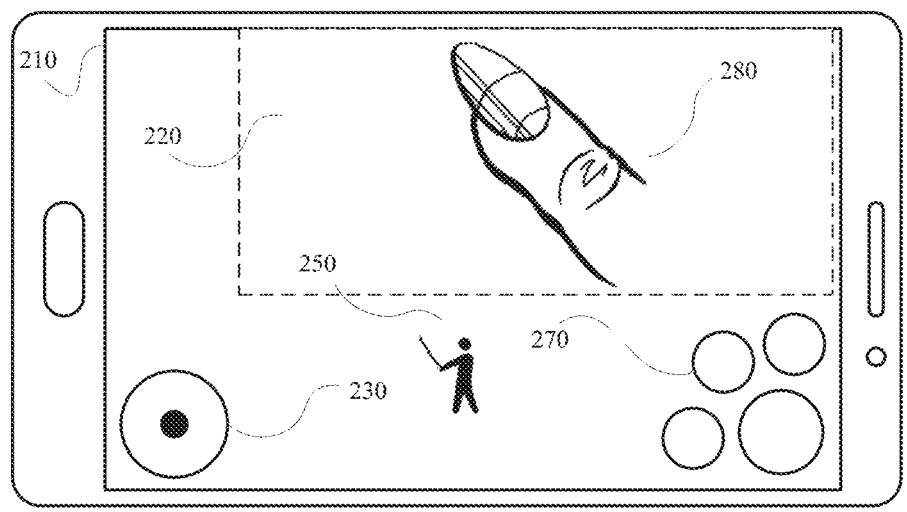
FIG. 9 is a schematic diagram of a game scene showing a press action exceeding a preset time according to one embodiment of the present disclosure.

As an optional embodiment, the preset action of the first touch operation may also be a touch action exceeding a preset time. For example, as shown in FIG. 9, during the period when the first touch operation adjusts the presentation field of the game scene 240 in the graphical user interface 210, when a touch action from a finger 280 exceeds a preset time is detected, i.e., the user uses a finger to press in the first touch operation area 220 for a long time, a path point is determined in the game scene 240 according to a touch point of the touch action, and the virtual character 250 is controlled to move automatically towards the path point in the game scene 240 according to a preset path finding strategy.

In this exemplary embodiment, the path finding strategy is a path finding strategy that the virtual character 250 moves between the virtual character 250 and the path point by the shortest path. Specifically, when any one of the above preset actions of the first touch operation is detected, a path point is determined in the game scene 240 according to the touch point of the preset action, and the virtual character 250 is controlled to find route automatically towards the path point in the game scene 240 according to a preset path finding strategy. For example, with regard to the finding route automatically based on the shortest path finding strategy, it should be noted that, the path with the shortest distance is not necessarily a straight path between the virtual character 250 and the path point. For example, when no obstacle (such as walls, rocks, etc. in the game scene 240) exists between the virtual character 250 and the path point, the shortest path is the straight path between the virtual character 250 and the path point; while, when there is an obstacle between the virtual character 250 and the path point, the path with the shortest distance is the path with the shortest distance bypassing the obstacle between the virtual character 250 and the path point.

As an optional embodiment, the path finding strategy may also be a path finding strategy that the virtual character moves between the virtual character and the path point by evading a monster, or adopts other preset path finding strategies.

In this exemplary embodiment, when a preset action of the first touch operation is detected, a position identifier is provided in the game scene, and the position identifier is located at the location of a path point. Specifically, when any one of the foregoing preset actions of the first touch operation is detected, as shown in FIG. 2, a position identifier 260 may be provided in the game scene. The position identifier 260 is located at the position of the path point and used to intuitively display a specific location of the path point in the game scene 240 to the user. The position identifier 260 may be any visually-indicative identifier, such as a cross cursor, an arrow indication identifier, a circle marker, etc., which is not limited in this exemplary embodiment.

It can be understood that, in the present exemplary embodiment, in order to save screen space and reduce blocking to the game scene 240, the position identifier 260 is deleted when it is detected that the virtual character 250 reaches or passes the location of the position identifier 260.

In this exemplary embodiment, when a preset action of the first touch operation is detected, determining a path point in the game scene according to a touch point of the preset action, and controlling the virtual character to move automatically towards the path point in the game scene according to a preset path finding strategy specifically includes:

when the first preset action of the first touch operation is detected, determining a first path point in the game scene according to the touch point of the first preset action, and controlling the virtual character to move automatically towards the first path point in the game scene according to a first preset path finding strategy; during the period when the virtual character moves towards the first path point, when a second preset action of the first touch operation is detected, determining a second path point in the game scene according to a touch point of the second preset action, and controlling the virtual character to move automatically towards the second path point in the game scene according to a second preset path finding strategy after the virtual character arrives at the first path point. That is, the virtual character 250 moves sequentially to the first path point and the second path point according to the determined precedence order of the first path point and the second path point. This embodiment enables the user to set a plurality of path points at a draught in the scene as needed, thereby controlling the moving path of the virtual character more accurately.

As an optional embodiment, when a preset action of the first touch operation is detected, determining a path point in the game scene according to a touch point of the preset action, and controlling the virtual character to move automatically towards the path point in the game scene according to a preset path finding strategy includes: when the first preset action of the first touch operation is detected, determining a first path point in the game scene according to the touch point of the first preset action, and controlling the virtual character to move automatically towards the first path point in the game scene according to a first preset path finding strategy; and during the period when the virtual character moves towards the first path point, when a second preset action of the first touch operation is detected, determining a second path point in the game scene according to a touch point of the second preset action, and controlling the virtual character to move automatically towards the second path point in the game scene according to a second preset path finding strategy immediately. That is, according to the determined precedence order of the first path point and the second path point, the first path point is cancelled at the time when the second path point is determined, then the virtual character is controlled to move to the last determined path point. The advantage of this embodiment lies in that it is more convenient for the user to update the path point at any time, without manually canceling the previously set path point additionally.

In this exemplary embodiment, the first preset action and the second preset action are identical, and the first preset path finding strategy and the second preset path finding strategy are identical. For example, both the first preset action and the second preset action are press actions exceeding a preset pressure, or both are touch actions exceeding a preset time, and, both the first preset path finding strategy and the second preset path finding strategy are path finding strategies that the virtual character moves between the virtual character and the path point by the shortest path. It can be understood that, in other embodiments, the first preset action may be different from the second preset action, and the first preset path finding strategy may be different from the second preset path finding strategy.

Figure 10:
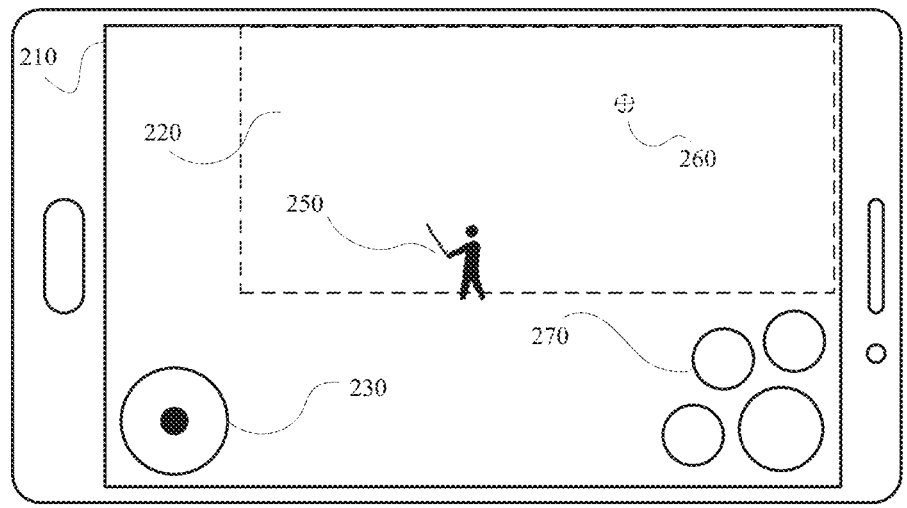
FIG. 10 is a schematic diagram of a game scene showing resetting the presentation field of the game scene in the graphical user interface according to one embodiment of the present disclosure.

In the exemplary embodiment, the presentation field of the game scene in the graphical user interface is reset when it is detected that the first touch operation ends, as shown in FIG. 10.

There are many ways to reset presentation field of the game scene in the graphical user interface, which may be resetting to a presentation field recalculated according to a logic by which the game calculates a presentation field before the first touch operation, or resetting to a certain field.

As a preferred embodiment, the step of resetting the presentation field of the game scene 240 in the graphical user interface 210 includes: resetting the presentation field of the game scene 240 in the graphical user interface 210 so that the virtual character 250 is centered on the presentation field of the game scene 240, as shown in FIG. 10. For example, FIG. 4 shows a presentation field of the game scene 240 in the graphical user interface 210 adjusted according to the first touch operation on the first touch operation area 220. At this time, the virtual character 250 in the game scene 240 is not displayed in the graphical user interface 210. When it is detected that the first touch operation is completed, the presentation field of the game scene 240 in the graphical user interface 210 is reset, so that the virtual character 250 is centered on the presentation field of the game scene 240, as shown in FIG. 3. At this time, the virtual character 250 in the game scene 240 is displayed almost in the middle of the graphical user interface 210. Therefore, it is convenient for the user to quickly restore the game field of the virtual character when the user obtains real-time control of the character again. The embodiment can be preferably applied to a game of a third person perspective. In the game of a first-person perspective, the presentation field is generally constructed by centering on the sight of the virtual character by default. In this case, it is preferable to reset the presentation field to center on the sight of the virtual character.

It can be understood that, in order to simplify the operation, in the present exemplary embodiment, the determination of the end of the first touch operation is that the touch object (for example, a finger or a stylus) leaves the touch screen.

In step S150, when a preset cancellation operation is detected, the path point is cancelled, and the virtual character is configured to move in the game scene according to the second touch operation on the second touch operation area.

The second touch operation area 230 may be an area having a visual indication effect in the graphical user interface 210, or an area having no visual indication effect. An operation area such as a virtual joystick or a direction control virtual key may be displayed in the second touch operation area 230, which is not limited in this exemplary embodiment. For example, in a specific embodiment of the present disclosure, as shown in FIG. 2, the second touch operation area 230 is a virtual joystick operation area, and the virtual joystick operation area is located at the lower left position of the graphical user interface 210. In other embodiments, the second touch operation area 230 may also be a virtual cross key area/virtual direction key (D-PAD) area.

As an optional embodiment, the second touch operation area 230 may be an area with visual indication in the graphical user interface 210. For example, the second touch operation area 230 may have a bounding box, or have a certain range of filling color, or have a certain range of preset transparency, or adopt other manners in which the second touch operation area 230 may be visually distinguished. The second touch operation area 230 with visual indication may allow the user to quickly locate the area, which may reduce the operation difficulty of the game for new players.

As another optional embodiment, the second touch operation area 230 may be an area without a visual indication in the graphical user interface 210. The second touch operation area 230 without a visual indication will not cover or affect the game picture, thus it can provide a better picture effect and save screen space. However, since there is no visual indication, it is not easily perceived by the user. As an improved implementation, a visual guiding control can be displayed in the second touch operation area 230. For example, in an embodiment of the present disclosure, when a virtual joystick is used as a directional control scheme for the virtual character 250, a virtual joystick may be displayed within the second touch operation area 230 to visually guide the user.

In the present exemplary embodiment, the preset cancellation operation includes the second touch operation on the second touch operation area 230. Specifically, when a second touch operation on the second touch operation area 230 is detected, the path point is cancelled, and the virtual character 250 is configured to move in the game scene 240 according to the second touch operation on the second touch operation area 230.

In the present exemplary embodiment, the second touch operation area 230 is a virtual joystick disposed at the lower left of the graphical user interface 210. A preset cancellation operation is set as the second touch operation on the second touch operation area 230, which conforms to operating habits of the user. By controlling the movement of the virtual character 250 through the virtual joystick, the user may quickly obtain the real-time control of the virtual character 250, which ensures the ease of use and timeliness of the operation.

As an optional embodiment, the preset cancellation operation includes a third touch operation on a cancellation control. Specifically, a cancellation control is provided at the graphical user interface 210. When a third touch operation on the cancellation control is detected, the path point is cancelled, and the virtual character 250 is configured to move in the game scene 240 according to the second touch operation on the second touch operation area 230. The third touch operation on the cancellation control may be operations such as click, long press, heavy press, touch, etc., which is not limited in this embodiment. By setting the cancellation control, users can avoid misoperation due to operating habits.

In the present exemplary embodiment, the position identification is deleted when a preset cancellation operation is detected. Specifically, in the above step 130, when a preset action of the first touch operation is detected, a position identifier 260 is provided in the game scene 240, and the position identifier 260 is located at the location of the path point. When any of the above preset cancellation operation is detected, the position identifier 260 is deleted.

It can be understood that, for ease of operation, a plurality of skill controls 270 may be provided in the graphical user interface 210, to provide the user with a control function for sending skills. The skill control 270 is disposed at a lower right position of the graphical user interface 210. Thus, the virtual character 250 in the game scene 240 may be controlled to shift and rotate by the left hand, and the skill control 270 can be controlled by the right hand to perform the skill cast of the virtual character 250. The skills indicated by the skill control 270 may be an attack skill (e.g., a skill that can reduce blood volume of the virtual subject of the enemy camp), a blood return skill (e.g., a skill that can raise the blood volume of the virtual subject of the own camp), and a freezing skill (e.g., a skill that makes a virtual object of the enemy camp motionless or sluggish); it may be a skill that requires a choice of direction, or it may be a skill that does not require a choice of direction (clicking is releasing), and so on. After the skill control 270 is touched, a virtual joystick for controlling the cast position or direction of the skill may be generated by centering on the skill control 270 or centering on an initial touch point of the user. The user may set cast position or direction of the skill by slide to control the virtual joystick, and cast the skill when the user finishes the touching.

Through the method provided by the present disclosure, operation space of the user is increased. When the virtual character moves, game scene pictures outside the visual field can be viewed at the same time. Behavior presetting is performed by using idle time and predictive ability of the user, which reduces stress of gusty parallel operation behaviors, and thus reducing the operating doorsill. In addition, the control of the virtual character whose behavior operation has been preset by the user may be restored at any time, so switching to/from the existing interaction manner may be achieved easily. Thereby, the present disclosure solves the technical problem that the multi-thread operation cannot be realized in the interaction manner of a mobile terminal.

Figure 5:
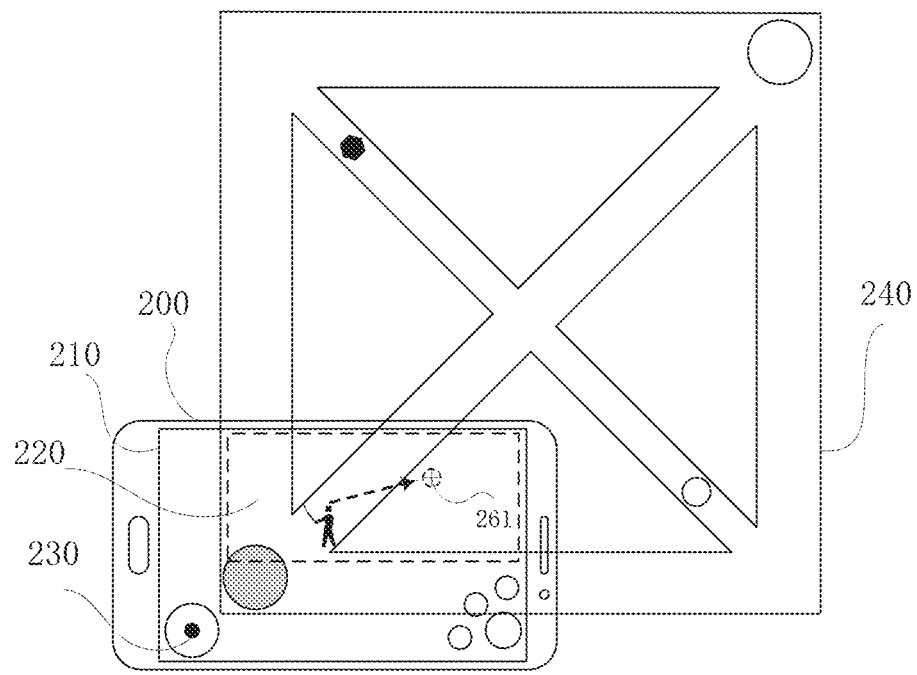
FIG. 5 is a schematic diagram of a third game scene according to one embodiment of the present disclosure.
Figure 6:
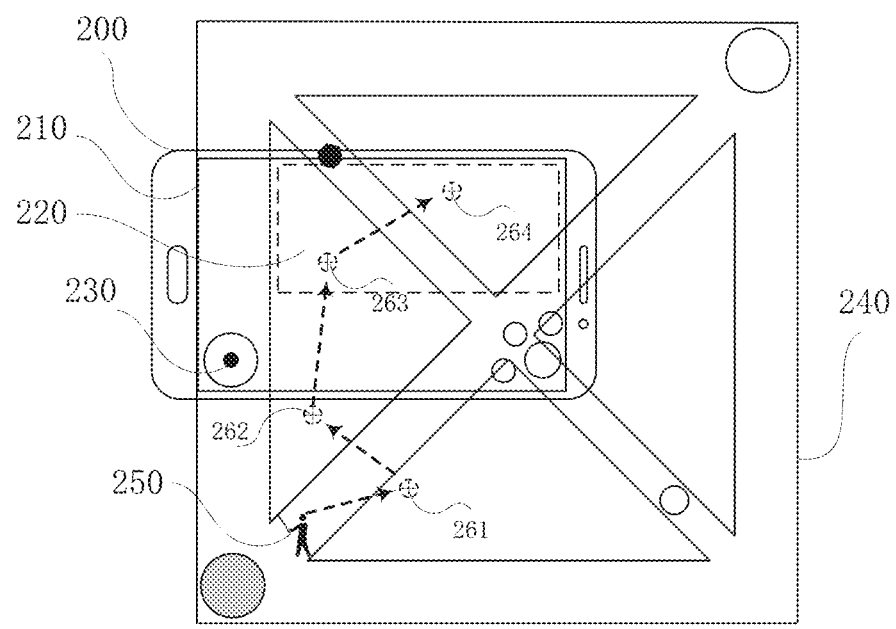
FIG. 6 is a schematic diagram of a fourth game scene according to one embodiment of the present disclosure.

The multi-thread operation of the user and corresponding responses during the execution of the method according to an alternative embodiment of the present disclosure will be illustrated in combination with FIGS. 5 to 6. A software application is executed by a processor of a mobile terminal 200 and a graphical user interface 210 is rendered on a touch display of the mobile terminal 200. The graphical user interface 210 includes a first touch operation area 220 and a second touch operation area 230, content presented by the graphical user interface 210 includes a game scene 240 and a virtual character 250.

When a slide operation on the first touch operation area 220 is detected, that is, when the user touches with one finger and performs a slide operation within the range of the first touch operation area 220 on the touch display of the mobile terminal 200, the presentation field of the game scene 240 in the graphical user interface 210 is adjusted according to the slide operation.

When a pressing action exceeding a preset pressure during the slide operation is detected, the first path point is determined in the game scene 240 according to the touch point of the pressing action, and a first location identifier 261 is provided at the location of the first path point, as shown in FIG. 5, which facilitates intuitively displaying the specific location of the first path point in the game scene 240 to the user, and controls the virtual character 250 to perform automatic path finding by the shortest path to the first position identifier 261 (i.e., the first path point) in the game scene 240.

The slide operation on the first touch operation area 220 is continuously detected, and the presentation field of the game scene 240 in the graphical user interface 210 is adjusted according to the slide operation, that is, the user stops the pressing operation, and continues the slide operation to adjust the presentation field of the game scene 240. At this time, the virtual character 250 of the user is automatically moving to the first position identifier 261 (i.e., the first path point), while the user may continue to observe the battle situations at the location of the battle and any game scene location.

During the period when the user performs the slide operation to adjust the presentation field of the game scene 240, when it is detected that a plurality of pressing actions exceed the preset pressure during the slide operation. That is, when the user presses a plurality of times in different positions of the game scene 240, a first position identifier 261, a second position identifier 262, a third position identifier 263 and a fourth position identifier 264 (respectively corresponding to the first path point, the second path point, the third path point and the fourth path point) are marked, as shown in FIG. 6, the virtual character 250 will perform the automatic path finding behavior successively by the shortest path in the order of the first position identifier 261, the second position identifier 262, the third position identifier 263 and the fourth position identifier 264.

When it is detected that the first touch operation is completed. i.e., the finger of the user leaves the first touch operation area 220, the presentation field of the game scene 240 in the graphical user interface 210 is reset, so that the virtual character 250 is centered on the presentation field of the game scene 240. In the case that the user does not perform any touch operation, the virtual character 250 still automatically moves to the previously preset path point.

In order to save the screen space and reduce blocking to the game scene, after the virtual character 250 arrives at or passes a position identifier, the position marker is deleted. For example, after the virtual character 250 reaches the first position identifier 261, the first position identifier 261 is deleted, and only the second position identifier 262, the third position identifier 263, and the fourth position identifier 264 are displayed on the graphical user interface 210.

When a second touch operation on the second touch operation area 230 is detected, the path point is canceled, at the same time, the position identifier displayed in the game scene 240 is also deleted, and the virtual character 250 is configured to move in the game scene 240 according to the second touch operation on the second touch operation area 230. According to operating habits of the user, the movement of the virtual character 250 is controlled through the virtual joystick, so that the user may quickly obtain the real-time control of the virtual character 250 and the ease of use and timeliness of the operation are ensured.

Through the method provided by the present disclosure, the user may achieve multi-thread operation at the same time, improve game experience and reduce concurrent operation amount of the user, reduce the operating doorsill. In addition, the control of the virtual character whose behavior operation has been preset by the user may be restored at any time, so switching to/from the existing interaction manner may be achieved easily.

For example, teammates and the enemy are battling in a game scene area outside the presentation field of the game scene in the current graphical user interface, and the user is rushing to the place where the battle takes place. The user needs to know the current battle situation in real time to judge the subsequent operation behavior after arriving at the location of the battle. At this time, the user can slide with his right thumb in the first touch operation area, adjust the presentation field of the game scene to the battle area, and performs press operation at a position that is relatively safe and has a good point of entry in the periphery of the battle area. At this time, the virtual character operated by the user will automatically move to the marked position and the user can continue observing the current battle situation at the same time. When it is found that the position of the path point needs to be adjusted, the virtual joystick can be used to clear the current path point and the user presses again with his/her right hand to mark other positions.

Figure 7:
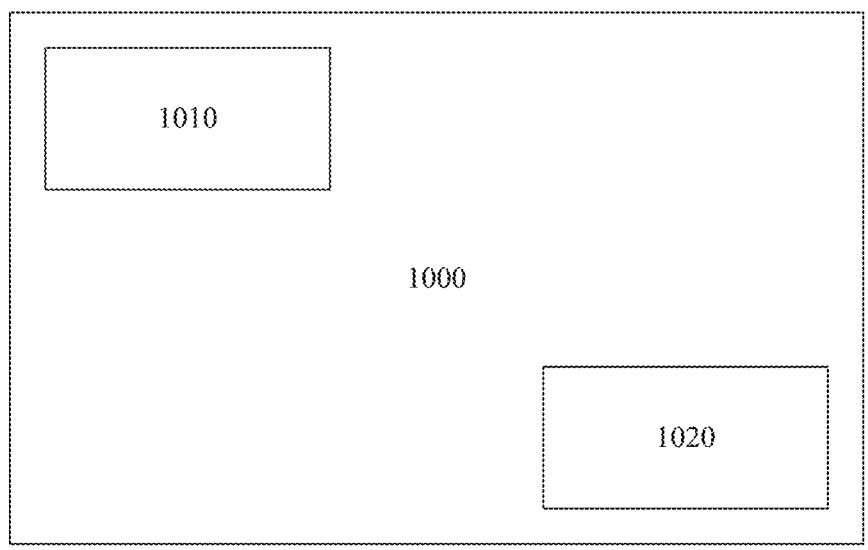
FIG. 7 is an information processing apparatus according to one embodiment of the present disclosure.

According to one embodiment of the present disclosure, an information processing apparatus is further provided. FIG. 7 is an information processing apparatus according to one embodiment of the present disclosure. As shown in FIG. 7, the present disclosure further provides an information processing apparatus 1000 that includes:

a processor 1010; and a memory 1020 for storing instructions executable by the processor 1010, wherein the processor 1010 is configured to perform the information processing method according to the above embodiments of the present disclosure by preforming the instructions.

The specific details of each unit of the above information processing apparatus have been described in detail in the corresponding information processing method, and therefore will not be repeated here.

It should be noted that, although several modules or units of the device for action execution are mentioned above in detail, this division is not mandatory. In fact, according to the embodiments of the present disclosure, the features and functions of two or more modules or units described above may be embodied in one module or unit. Conversely, the features and functions of one module or unit described above may be further divided into a plurality of modules or units to be embodied.

According to one embodiment of the present disclosure, a non-transitory storage medium (computer-readable storage medium) is further provided, on which a program product capable of implementing the above method of the present specification is stored. In some possible embodiments, various aspects of the present disclosure may also be implemented in the form of a program product, which includes program codes for causing a terminal device to execute steps according to various exemplary embodiments of the disclosure described in the above exemplary method in the present specification when the program product runs on the terminal device. The program product can use portable Compact Disc Read-Only Memory (CD-ROM) and include program codes, and can run on a terminal device such as a personal computer. However, the program product of the present disclosure is not limited thereto, and in this document, the readable storage medium may be any tangible medium that contains or stores a program that can be used by or in conjunction with an instruction execution system, an apparatus, or a device.

The program product may employ one or any combination of more readable media. The readable medium may be a readable signal medium or a readable storage medium. A readable storage medium may be, for example but not limited to, an electronic, magnetic, optical, electromagnetic, infrared, or semiconductor system, apparatus, or device, or any combination of the above readable medium. More specific examples (non-exhaustive listings) of readable storage media include: electrical connections with one or more wires, portable disks, hard disks, a random access memory (RAM), a read only memory (ROM), an erasable programmable read-only memory (EPROM or flash memory), an optical fiber, a portable compact disc read-only memory (CD-ROM), an optical storage device, a magnetic storage device, or any suitable combination of the above readable storage media.

According to one embodiment of the present disclosure, an electronic device is further provided. The electronic device includes: a processing component which may further include one or more processors; and a memory resource represented by a memory for storing instructions (such as the application) that may be executed by the processing component. The application stored in the memory may include one or more modules each corresponding to a set of instructions. In addition, the processing component is configured to execute instructions to perform the above-described information processing method.

The electronic device may also include: a power supply component configured to perform power management of the execution electronic device; a wired or wireless network interface configured to connect the electronic device to the network; and an input output (I/O) interface. The electronic device may operate based on an operating system stored in a memory, such as Android, iOS, Windows, Mac OS X, Unix, Linux, FreeBSD, or the like.

The sequence numbers of the foregoing embodiments of the present disclosure are merely for description purpose and do not represent the advantages and disadvantages of the embodiments.

In the foregoing embodiments of the present disclosure, the description of each embodiment has its own emphasis. For the part not described in detail in one embodiment, reference may be made to the relevant description of other embodiments.

In the several embodiments provided by the present application, it should be understood that the disclosed technical content may be implemented in other manners. The apparatus embodiments described above are merely illustrative, and for example, the division of units may be a logical function partition. In practice, there may be another partition manner. For example, a plurality of units or components may be combined or may be integrated into another system, or some features can be ignored or not implemented. In addition, the illustrated or discussed coupling or direct coupling or communication connection to each other may be indirect coupling or communication connection through some interfaces, units or modules, and may be electrical or in other forms.

The units described as separate parts may or may not be physically separated, and the part shown as a unit may or may not be a physical unit, that is, may be located in one place, or may be distributed on a plurality of units. A part of or all of the units may be selected according to actual needs to achieve the solution of this embodiment.

In addition, every functional unit in each embodiment of the present disclosure may be integrated in one processing unit, or each unit may exist alone physically, or two or more units may be integrated in one unit. The above integrated unit can be implemented either in hardware or in software.

Integrated units, if implemented in the form of software functional units and sold or used as a separate product, can be stored in a computer-readable storage medium. Based on this comprehension, the substance of the technical solution of the present disclosure, or the part that contributes to the prior art, or all or part of the technical solution, may be embodied in the form of a software product. The computer software product is stored in a storage medium, including a plurality of instructions for causing a computer device (which may be a personal computer, a server, a network device, or the like) to perform all or part of the steps of the method according to various embodiments of the present disclosure.

The above are merely preferred embodiments of the present disclosure, and it should be pointed out that, those of ordinary skill in the art can also make several improvements and improvements without departing from the principle of the present disclosure. These improvements and modifications should also be regarded as the scope of protection of the present disclosure.

What is claimed is:

1. An information processing method, wherein a software application is executed by a processor of a mobile terminal and a graphical user interface is rendered on a touch display of the mobile terminal, the graphical user interface comprises a first touch operation area and a second touch operation area, content presented by the graphical user interface at least comprises a part of a game scene and a virtual character, and the method comprises:

when a first touch operation on the first touch operation area is detected, adjusting a presentation field of the game scene in the graphical user interface according to the first touch operation;

when a preset action of the first touch operation is detected, determining a path point in the game scene according to a touch point of the preset action, and controlling the virtual character to move automatically towards the path point in the game scene according to a preset path finding strategy;

when a preset cancellation operation is detected, cancelling the path point, and configuring the virtual character to move in the game scene according to a second touch operation on the second touch operation area, and wherein the method further comprises: when the preset action of the first touch operation is detected, providing a position identifier in the game scene, wherein the position identifier is located at a location of the path point.

2. The method according to claim 1, wherein the preset action of the first touch operation comprises a press action exceeding a preset pressure.

3. The method according to claim 1, wherein the preset action of the first touch operation comprises a touch action exceeding a preset time.

4. The method according to claim 1, wherein the method further comprises: when the preset cancellation operation is detected, deleting the position identifier.

5. The method according to claim 1, wherein the step of when the preset action of the first touch operation is detected, determining the path point in the game scene according to a touch point of the preset action, and controlling the virtual character to move automatically towards the path point in the game scene according to the preset path finding strategy comprises:

when the first preset action of the first touch operation is detected, determining a first path point in the game scene according to the touch point of the first preset action, and controlling the virtual character to move automatically towards the first path point in the game scene according to a first preset path finding strategy; and during a period when the virtual character moves towards the first path point, when a second preset action of the first touch operation is detected, determining a second path point in the game scene according to a touch point of the second preset action, and controlling the virtual character to move automatically towards the second path point in the game scene according to a second preset path finding strategy after the virtual character arrives at the first path point.

6. The method according to claim 5, wherein the first preset action and the second preset action are identical, and the first preset path finding strategy and the second preset path finding strategy are identical.

7. The method according to claim 1, wherein the step of when the preset action of the first touch operation is detected, determining the path point in the game scene according to a touch point of the preset action, and controlling the virtual character to move automatically towards the path point in the game scene according to the preset path finding strategy comprises:

when the first preset action of the first touch operation is detected, determining a first path point in the game scene according to the touch point of the first preset action, and controlling the virtual character to move automatically towards the first path point in the game scene according to a first preset path finding strategy; and during a period when the virtual character moves towards the first path point, when a second preset action of the first touch operation is detected, determining a second path point in the game scene according to a touch point of the second preset action, and controlling the virtual character to move automatically towards the second path point in the game scene according to a second preset path finding strategy immediately.

8. The method according to claim 1, wherein the method further comprises: when it is detected that the first touch operation ends, resetting the presentation field of the game scene in the graphical user interface.

9. The method according to claim 8, wherein the step of resetting the presentation field of the game scene in the graphical user interface comprises: resetting the presentation field of the game scene in the graphical user interface so that the virtual character is centered on the presentation field of the game scene.

10. The method according to claim 1, wherein the preset cancellation operation comprises the second touch operation on the second touch operation area.

11. The method according to claim 1, wherein the preset cancellation operation comprises a third touch operation on a cancellation control.

12. A mobile terminal, comprising:
a processor; and
a memory for storing instructions executable by the processor,
wherein, when the instructions are executed by the processor, a graphical user interface is rendered on a touch display of the mobile terminal, the graphical user interface comprises a first touch operation area and a second touch operation area, content presented by the graphical user interface at least comprises a part of a game scene and a virtual character, and the processor is configured to perform;
when a first touch operation on the first touch operation area is detected, adjusting a presentation field of the game scene in the graphical user interface according to the first touch operation;
when a preset action of the first touch operation is detected, determining a path point in the game scene according to a touch point of the preset action, and controlling the virtual character to move automatically towards the path point in the game scene according to a preset path finding strategy;
when a preset cancellation operation is detected, cancelling the path point, and configuring the virtual character to move in the game scene according to a second touch operation on the second touch operation area, and
wherein the method further comprises: when the preset action of the first touch operation is detected, providing a position identifier in the game scene, wherein the position identifier is located at a location of the path point.

13. The mobile terminal according to claim 12, wherein the preset action of the first touch operation comprises a press action exceeding a preset pressure.

14. The mobile terminal according to claim 12, wherein the preset action of the first touch operation comprises a touch action exceeding a preset time.

15. The mobile terminal according to claim 12, wherein the processor is further configured to: when the preset action of the first touch operation is detected, provide a position identifier in the game scene, wherein the position identifier is located at a location of the path point.

16. The mobile terminal according to claim 15, wherein the processor is further configured to: when the preset cancellation operation is detected, delete the position identifier.

17. The mobile terminal according to claim 12, wherein the processor is further configured to:
when the first preset action of the first touch operation is detected, determine a first path point in the game scene according to the touch point of the first preset action, and control the virtual character to move automatically towards the first path point in the game scene according to a first preset path finding strategy; and during a period when the virtual character moves towards the first path point, when a second preset action of the first touch operation is detected, determine a second path point in the game scene according to a touch point of the second preset action, and control the virtual character to move automatically towards the second path point in the game scene according to a second preset path finding strategy after the virtual character arrives at the first path point.

18. The mobile terminal according to claim 12, wherein the processor is further configured to:
when the first preset action of the first touch operation is detected, determine a first path point in the game scene according to the touch point of the first preset action, and control the virtual character to move automatically towards the first path point in the game scene according to a first preset path finding strategy; and during a period when the virtual character moves towards the first path point, when a second preset action of the first touch operation is detected, determine a second path point in the game scene according to a touch point of the second preset action, and control the virtual character to move automatically towards the second path point in the game scene according to a second preset path finding strategy immediately.

19. A non-transitory storage medium having stored therein instructions that is executable by a processor of a mobile terminal, wherein, when the instructions are executed by the processor, a graphical user interface is rendered on a touch display of the mobile terminal, the graphical user interface comprises a first touch operation area and a second touch operation area, content presented by the graphical user interlace at least comprises a part of a game scene and a virtual character, and the processor is configured to perform:
when a first touch operation on the first touch operation area is detected, adjusting a presentation field of the game scenic in the graphical user interface according to the first touch operation;
when a preset action of the first touch operation is detected, determining a path point in the game scene according to a touch point of the preset action, and controlling the virtual character to move automatically towards the path point in the game scene according to a preset path finding strategy;
when a preset cancellation operation is detected, cancelling the path point, and configuring the virtual character to move in the game scene according to a second touch operation on the second touch operation area, and
wherein the method further comprises: when the preset action of the first touch operation is detected, providing a position identifier in the game scene, wherein the position identifier is located at a location of the path point.

* * * * *